United States Patent [19]

Hupf

[11] Patent Number: 4,697,501
[45] Date of Patent: Oct. 6, 1987

[54] STIFFENING SPRING HOSE CLAMP

[75] Inventor: Charles J. Hupf, Cascade, Wis.

[73] Assignee: Regal Ware, Inc., Kewaskum, Wis.

[21] Appl. No.: 822,570

[22] Filed: Jan. 27, 1986

[51] Int. Cl.⁴ .................... A47J 31/00; F16L 11/00
[52] U.S. Cl. .................... 99/279; 138/DIG. 8; 138/110
[58] Field of Search ............ 99/179, 280, 281, 282, 99/283, 284, 295, 300, 301, 302 R; 138/DIG. 8, 110; 285/420; 426/433

[56] References Cited

U.S. PATENT DOCUMENTS

| 1,140,307 | 5/1915 | Hurley | 138/110 |
| 1,249,038 | 12/1917 | Dabney | 138/110 |
| 2,185,741 | 1/1940 | Sorg | 138/110 |
| 4,089,326 | 5/1978 | Andrassy | 138/110 |
| 4,508,023 | 4/1985 | Naya | 99/284 |

Primary Examiner—Robert W. Jenkins
Attorney, Agent, or Firm—Wheeler Law Firm

[57] ABSTRACT

A coffee maker contains a flexible tube connecting rigid tubes. A coil spring serves to stiffen and support the flexible conduit and to clamp the end of the same conduit to a more rigid tube. There are closely wound clamping turns at the end of the coil spring which perform the clamping function while the rest of the coil spring stiffens and supports the flexible conduit.

9 Claims, 2 Drawing Figures

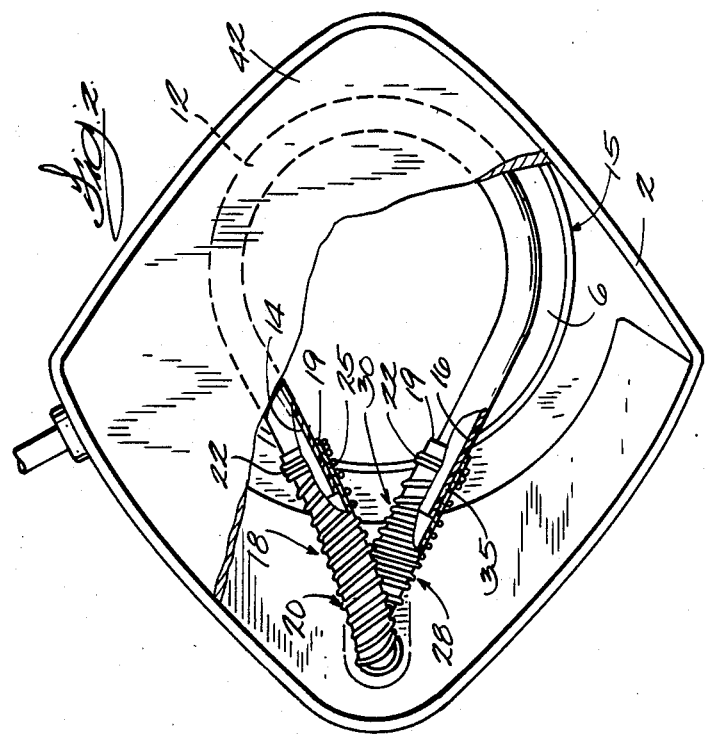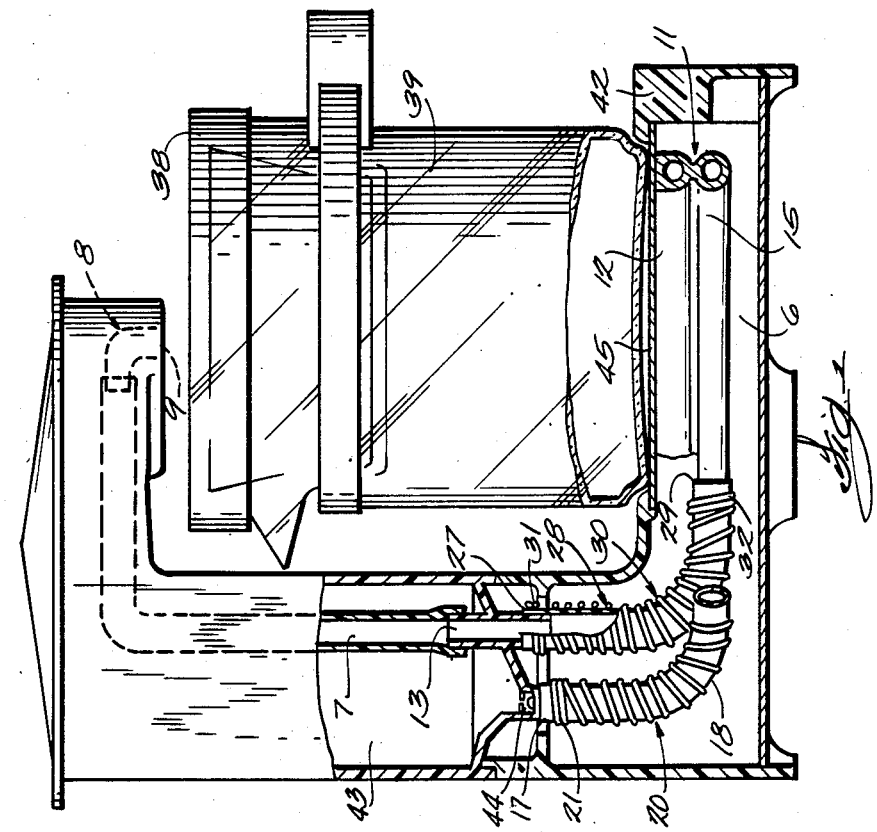

STIFFENING SPRING HOSE CLAMP

BACKGROUND OF THE INVENTION

It is well known to use a plastic hose to conduct fluid from one hard conduit to another hard conduit because soft plastic is readily bent to fit in places where a hard conduit would have to be made extremely accurately to fit. Likewise connections are readily made with soft plastic hoses that are more difficult to complete with parts that are hard. Where the conduit must carry a warm or hot fluid, it is also known to place a metallic coil spring having a uniform diameter and evenly spaced turns outside of the plastic conduit to give it sufficient stiffness to maintain its form when it is softened by heat and when it is curved. Curving a tube tends to flatten it unless support is provided.

One problem in such connections is the integrity of the joint between the hard conduit such as a plastic or metal pipe and the soft plastic conduit. One solution to that problem is to use any of a variety of hose clamps. However, that is an extra part to be purchased and installed. Applicant has discovered a way to make the stiffening spring serve as a hose clamp and at the same time make a connection sufficiently resistant to separation as to meet Underwriters Laboratories standards for the safety of a connection carrying hot coffee. For the purposes of illustration, the connection of this invention is illustrated as it would be used to secure the ends of plastic connections in a coffee percolator carrying hot water from the reservoir to the metal conduit in which the water is heated and from the heating conduit to the coffee basket where the heated water will perculate through the coffee grounds. Such a connection is old so far as the metal heating tube, the soft plastic conduit, and the coil spring stiffener for the soft conduit are concerned but is new in the modification of the coil spring stiffener to form clamps for the plastic hoses.

SUMMARY OF THE INVENTION

My invention in its most fundamental form comprises forming a series of close wound loops at the end of a coil spring, which loops lie side by side with no substantial space between them. Such a series of close wound loops is formed at each end of a coil spring which is otherwise sufficiently open as to serve as a stiffener for a soft plastic conduit. In general the space between the loops of such a spring may be from half the coil diameter to the full coil diameter and the coil diameter is so chosen as to be an easy fit over the selected plastic tube.

With the addition of approximately three closely wound coils at the end, which are wound to a diameter slightly smaller than the selected plastic tube when installed over a hard conduit on which it is a press fit, a new function becomes available. The plastic tube is inserted in the coil stiffener, turning the tube slightly to open the coils of the end stiffener enough to admit the tube. When the free end of the tube is within the coils of the stiffener, the plastic tube is installed over the hard conduit in the usual way, expanding the coils of the end portion slightly in the process. Thus there are no new assembly steps over simply putting the stiffener over the plastic tube and placing the plastic tube in place on the hard conduits that it connects. However because of the presence of the slightly undersized and closely wound end coils, the stiffener functions as a hose clamp sufficient to meet Underwriters Laboratories standards for safe connections to carry the heated water in a coffee percolator which is a home appliance.

Because the installation of the plastic tube in the stiffening coils leaves the closely wound section of the other end of the coil at the other end of the plastic tube that end of the plastic tube also has merely to be installed over a rigid conduit to complete the connection at both ends and to supply a clamp for the connection without the need of installing any separate piece.

A still further refinement is that the center coils of the stiffener may be wound to the full tube diameter but closely wound to avoid tangling of the springs while said springs are thrown together in a container before they are installed on the plastic tube. In that form, the diameters are still chosen so that the closely wound center portion is at least the full diameter of the tubing whereas the closely wound end sections are each slightly smaller than the full diameter of the tubing. The only difference in installation is that the coil will initially be all at one end of the tubing until after the first and second ends of the soft plastic tubing have been installed on hard ducts. At that point, one end of the coil will already be holding the end of the plastic tubing on its duct but the other end must be pulled out to overlie the other hard duct in order to be fully installed. Desirably the tension in the coil spring is exceedingly low so that there is no force tending to pull the ends together again, or at least an exceedingly small force. The major force is the force of contraction of the coil spring around the soft plastic tubing and the hard duct over which the soft plastic duct is installed.

DESCRIPTION OF DRAWINGS

FIG. 1 is a side elevational view with the parts broken away to show the internal structure.

FIG. 2 is a bottom view with the parts broken away.

DESCRIPTION OF PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The electric coffee maker shown in FIG. 1 comprises a fresh-water tank 43 on a housing base 42. The housing cavity 6 in the housing base 42 is closed off by a hot plate 45 on which a carafe 39 can be deposited. On the bottom side of the hot plate 45 is a water heater in the form of a flow-through (continuous-flow) heater 11. The continuous-flow heater 11 has a tubular heating element 12 which rests against the hot plate 45 and is connected to a water tube 15 underneath in a heat-conducting manner. The water tube 15 is connected at end 14 to the fresh-water tank 43 via a flexible cold-water conduit 18 and a check valve 44. A flexible hot-water conduit 28 is connected to the other end 16 of the water tube 15. Both the cold-water conduit 18 and the hot-water conduit 28 are supported by stiffening coil springs 20 and 30, respectively. The hot-water conduit 28 is connected to a delivery conduit 7 by a connecting tube 13. The delivery conduit 7 is connected to a discharge tube 8 which ends above a coffee basket 38 placed on the carafe 39 with a run-out or discharge opening 9 which points down.

The cold-water conduit 18 is connected at one end 19 to end 14 of the water tube 15 of the continuous-flow heater 11 creating an area of overlap 25. When the cold-water conduit 18 is forced over the end 14 of the water tube 15 during assembly, the diameter of the cold-water conduit 18 is expanded in the area of overlap 25. The stiffening coil spring 20 which supports the cold-water conduit 18 has approximately three (3) closely wound (clamping) turns 22 which are located over the area of overlap 25 and secure the end 19 of the cold-water conduit 18 to the end 14 of the water tube 15.

The clamping turns 22 have a diameter larger than the original diameter of the cold-water conduit 18 to facilitate placement of the stiffening coil spring 20 over the cold-water conduit 18 prior to installation, but smaller than the diameter of the cold-water conduit 18 in its expanded state in the area of overlap 25, thereby exerting pressure on both the cold-water conduit 18 and the end 14 of the water tube 15 inserted therein, sufficient to prevent the leakage of water. Since the water tube 15 is connected in a heat conducting manner to the tubular heating element 12 of the continuous-flow heater 11, the flexible cold-water conduit 18 tends to soften in the area of overlap 25 where it is in direct contact with the water tube 15 and is likely to slip off the end 14 of the water tube 15. The clamping turns 22 tend to prevent this possibility.

Similarly, the hot-water conduit 28 is softened by being in direct contact with the other end 16 of the water tube 15 which is connected in a heat conducting manner to the tubular heating element 12 of the continuous-flow heater 11. The hot-water conduit 28 is further softened over its entire length by the flow of heated water through it. The stiffening coil spring 30 keeps the hot-water conduit 28 in its proper position. The clamping turns 32 of the stiffening coil spring 30 tend to insure that the end 29 of the hot-water conduit 28 will not slip off the end 16 of the water tube 15, and that no leakage will occur.

By using a similar set of clamping turns 31 to secure the other end 27 of the hot-water conduit 28 to the connecting tube 13 and another set of clamping turns 21 to secure the other end 17 of the cold-water conduit 18 to the check valve 44 the potential for leakage from these connections is reduced.

What is claimed is:

1. A device comprising a relatively flexible conduit, a relatively inflexible conduit, and means to pass a fluid through said conduits, comprising:
    the combination of a relatively flexible conduit of a preselected outer diameter, a relatively inflexible conduit having an outer diameter which allows said inflexible conduit to be inserted into an end of said flexible conduit, an area of overlap created by the insertion of said inflexible conduit into said flexible conduit wherein the outer diameter of the flexible conduit is expanded by the insertion of said inflexible conduit, a spring coil consisting entirely of helical turns surrounding said flexible conduit over a major portion of its length for supporting said flexible conduit having at least three relatively closely spaced entirely helical clamping turns located where said coil spring surrounds said area of overlap and secures said flexible conduit to said inflexible conduit.

2. A device as recited in claim 1 wherein said means passes heated fluid through said conduits.

3. A device as recited in claim 2 wherein said relatively inflexible conduit is connected in a heat conducting manner to a heat source.

4. A device as recited in claim 2 wherein said conduits are at least partly located in an environment subject to vibration.

5. A device as recited in claim 1 further comprising a coffee maker having a coffee basket and a heated tube wherein said means to pass fluid propels water toward said coffee basket.

6. The device of claim 5 wherein at least one said flexible tube is connected to said heated tube.

7. A device as recited in claim 1 wherein the diameter of said coil spring is everywhere greater than the diameter of said flexible conduit prior to the insertion of said inflexible conduit therein.

8. A device as recited in claim 1 wherein the diameter of said coil spring in said area of overlap is less than the diameter of said coil spring in the other areas.

9. In a coffee maker having a cold-water reservoir, a coffee basket and a continuous flow heater for heating and propelling water from said reservoir toward said basket, a device comprising:
    a number of flexible conduits of a pre-selected diameter for passing water from said reservoir through said heater and to said coffee basket,
    a number of relatively inflexible conduits having a diameter which allows insertion of said inflexible conduits into the ends of said flexible conduits,
    areas of overlap created by the insertion of said inflexible conduits into the ends of said flexbile conduits,
    a number of coil springs having a diameter greater than that of said flexible conduits each of which surrounds one of said flexible conduits for a major portion of its length for supporting said flexible conduit, each said coil spring having at least three relatively closely spaced helical clamping turns of a relatively reduced diameter located where said coil springs surround said areas of overlap and securing said flexible conduits to said inflexible conduits, each turn of each said coil spring being substantially circular before said coil spring is installed.

* * * * *